3,215,627
POOL STERILIZATION
Jerry F. Tools, Miami, Fla., assignor to Alto Chemical Laboratory, Inc., Miami, Fla., a corporation of Florida
No Drawing. Filed Nov. 26, 1962, Ser. No. 240,154
6 Claims. (Cl. 210—62)

The present invention relates to a novel formulation for sterilizing the water of swimming and wading pools and like bodies of confined water and to a method of sterilizing pool water therewith. More particularly the invention resides in the controlled in situ generation of $I_2$ in an ionic configuration having germicidal properties by the interaction of a persulfate such as sodium persulfate and an iodide such as sodium iodide under prescribed conditions.

It is known that iodine ($I_2$) can be released from iodides such as NaI or KI by an oxidizing agent. Iodine also exists in crystalline form and as an $I_2$ molecule in water as well as in other molecular configurations having bactericidal properties to the same or to a lesser extent than $I_2$. Among the other known molecular configurations of iodine are $I_3^-$, $IO^-$ and $IO_3^-$. This knowledge has, however, not provided those working in the art of pool sterilization with a satisfactory formula of practical value as evidenced by the fact that there is now no fully successful formulation and procedure in commercial use despite the need therefor. Systems involving the use of a chlorine compound for releasing $I_2$ have not proved to be acceptable, in particular, as they cause irritation to the bathers' eyes and nasal mucosa, corrode the pool pumping equipment and require frequent chemical readjustment.

In order to provide a bactericidally active iodine residual and to maintain it at the right level or concentration, a number of operational and technical problems must be solved. Prior to the present invention such have not been accomplished.

Certain aspects of the chemistry of iodine are illustrative:

(1) $$I_2 + I^- \rightleftharpoons I_3^-$$

Formation of the tri-iodide ion ($I_3$) is undesirable. It is much less active bactericidally and is hence of undesirable ionic form. The presence of an iodide salt in solution in association with $I_2$ shifts the above equilibrium to the right.

(2) 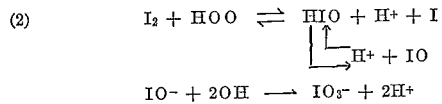

$$IO^- + 2OH \longrightarrow IO_3^- + 2H^+$$

Thus $I_2$ can hydrolyze to form HIO (hypo-iodous acid) and increasing pH shifts the equilibrium to favor formation of the non-bactericidally active $IO_3^-$ (iodate ion).

(3) 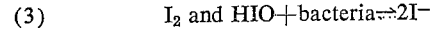

The above can be considered as illustrating the effect on iodine ($I_2$ and HIO) of bacteria. The iodide ion again results.

According to my invention, I have found that a persulfate salt, e.g. sodium persulfate, having the proper oxidizing potential must be selected and used in an amount many times that of the theoretical stoichiometric amount required to provide a desired iodine residual. This amount, which ranges from 5 to 20 times the stoichiometric amount, is herein termed a "bank" of persulfate.

The bank of persulfate is added to a swimming pool, for example, and then a quantity of sodium iodide or other suitable iodide salt is added in that amount which will provide the desired effective iodine ($I_2$) residual. The persulfate is also replenished to maintain its ratio to iodide many times (5 to 20 times) in excess of the stoichiometric amount needed for the selected iodine residual from the total iodide in the swimming pool.

The reaction between persulfate and iodide can be depicted as occurring in the following two steps:

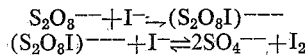
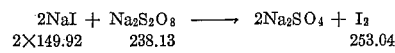

The stoichiometric equation for sodium persulfate and sodium iodine is as follows:

$$\underset{2\times 149.92}{2NaI} + \underset{238.13}{Na_2S_2O_8} \longrightarrow \underset{}{2Na_2SO_4} + \underset{253.04}{I_2}$$

Assuming, as I have found, that the desired iodine residual is 0.2 part per million (p.p.m.) of $I_2$:

$$\frac{0.2 \times 299.84}{253.04} = 0.237 \text{ p.p.m. NaI}$$

$$\frac{0.2 \times 238.13}{253.04} = 0.1882 \text{ p.p.m. } Na_2S_2O_8$$

The foregoing equations and calculations show the amounts of reactants needed to give an iodine residual of 0.2 p.p.m. $I_2$. This iodine residual is quite satisfactory and provides swimming pool water of excellent bacteriological quality. To produce this iodine ($I_2$) residual of 0.2 p.p.m. from an iodide salt, 0.1882 p.p.m. (based on 100 percent persulfate activity) of sodium persulfate are required, on a theoretical basis. In actual field operation, however, this theoretical quantity does not produce the desired iodine residual. I have found that 5 to 20 times the theoretical (stoichiometric) amount of persulfate must be maintained as an oxidizing bank and that the iodide must be added so as to obtain and maintain the required iodine residual which for operational purposes should range from 0.2 to 0.4 p.p.m. of $I_2$. Below 0.2 p.p.m. the anti-bacterial results are not effectively achieved; above 0.4 p.p.m. the water acquires a noticeable coloration and is objectionable. A residual above 0.4 p.p.m. is, moreover, uneconomical and no bactericidal advantage accrues. The range of 0.2 to 0.4 p.p.m. of $I_2$ is, therefore, of critical significance. It will further be observed that under the above conditions, there is a build-up of sulfate. No toxic or other adverse effects of such have been noted and hence the presence of sulfate is not objectionable.

The $I_2$ produced is converted to iodide by bacteria and/or organic material but becomes available again for reconversion to $I_2$ by the oxidizing bank of persulfate. Some $I_2$ is lost to the atmosphere. Some is converted to $IO^-$ and thence to $IO_3^-$, depending on the pH of the particular pool. By maintaining the pH of the pool below 8.0, iodate build-up is minimized and, in fact, iodate formation is very slow and of minor importance when the pH of the pool is held in the proper range for swimming pool water.

The invention will be further understood from the following example with respect to a 10,000 gallon pool over a ten-day period.

On odd-numbered days, 9 grams of sodium iodide are added; on even-numbered days, 90 grams of sodium persulfate are added. These quantities of the chemicals will produce a prolonged $I_2$ residual between 0.2 p.p.m. and 0.4 p.p.m. of $I_2$.

The $I_2$ residual was tested with an amperometric titrator. All samples were buffered with the standard amperometric titrator pH 7.0 buffer and titrated at pH 7.0 with phenyl arsenoxide according to the standard procedure outlined in A.P.H.A., 11th Edition, for the determination of residual chlorine. The iodine residuals are expressed as total $I_2$. Iodine and persulfate test kits are commercially available for pool testing.

The invention is characterized by unique features and advantages not heretofore achieved. As there is no excess of iodide salt, the molecular configuration $I_3$ does not predominate. Since $I_3$ is a much less desirable germicide, its presence is not desired and its reduced formation is advantageous. By holding the pH in an operating range below 8.0, iodate ($IO_3^-$) production is also kept low and the predominating iodine molecular configurations are in the forms of hypoiodous acid (HIO) and $I_2$ which are the most active bactericidally. Other proportions of persulfate and iodide are either unsatisfactory or far less effective. An iodide bank used with incremental additions of persulfate is valueless because iodine release is erratic and unpredictable and a desired iodine level cannot be consistently or continuously attained. Other oxidizing agents such as chlorine compounds are unreliable and either produce high iodate formation or make it impracticable to get a chlorine level which provides a required iodine residual in the desired molecular configuration.

The primary effect of the present invention is to render swimming pool water bacteriologically acceptable for bathing with optimum iodine residual in desired molecular configuration. The secondary effect is to avoid objectionable coloration of the swimming pool water by controlling the $I_2$ residual between predetermined limits. Extensive experimental work has demonstrated the efficacy of the present invention.

It is to be understood that the present invention is not limited to the use of sodium salts which have been used only for exemplary purposes as any suitable iodide or persulfate salt can be used. The iodide thus can be also potassium, lithium or other alkali or alkaline earth metal salt and the persulfate can be potassium, ammonium or other persulfate salt having an oxidation potential appropriate for the prescribed manner of use as set forth above.

What is claimed is:

1. A pool sterilizing formulation consisting essentially of a quantity of a persulfate and an inorganic iodide which when added alternately to pool water under substantially neutral pH conditions provides an iodine residual of 0.2 to 0.4 p.p.m. of $I_2$ in an ionic configuration having active germicidal properties, said persulfate being in excess of the stoichiometric proportion for reaction with the iodide.

2. A formulation according to claim 1, in which the amount of persulfate is 5 to 20 times that stoichiometrically required to react with the iodide.

3. A formulation according to claim 1, in which the persulfate is sodium persulfate and the iodide is sodium iodide.

4. A method of treating pool water which comprises maintaining therein under substantially neutral pH conditions an iodine residual of 0.2 to 0.4 part of $I_2$ per million parts of pool water in an active ionic configuration by adding thereto on alternate days a persulfate and an iodide, the persulfate being in excess of the stoichiometric proportion for reaction with the iodide.

5. A method according to claim 4, in which the persulfate is 5 to 20 times the amount stoichiometrically required for reaction with the iodide.

6. A method according to claim 4, in which the persulfate is sodium persulfate and the iodide is sodium iodide.

References Cited by the Examiner

UNITED STATES PATENTS

| | | | |
|---|---|---|---|
| 2,902,405 | 9/59 | Carroll et al. | 167—17 |
| 2,904,470 | 9/59 | Berliner et al. | 167—17 |
| 2,918,400 | 12/59 | Loonam | 167—17 |
| 3,041,139 | 6/62 | D'Addieco et al. | 23—114 |
| 3,058,875 | 10/62 | Goodenough | 167—17 |
| 24,875 | 7/22 | France. | |

FOREIGN PATENTS

| | | |
|---|---|---|
| 24,875 | 7/22 | France. |

MORRIS O. WOLK, *Primary Examiner.*